(12) United States Patent
Schicker et al.

(10) Patent No.: US 11,524,711 B2
(45) Date of Patent: Dec. 13, 2022

(54) METHOD FOR MOUNTING A RAIL MONITORING ELEMENT

(71) Applicant: Thales Management & Services Deutschland GmbH, Ditzingen (DE)

(72) Inventors: Kai Schicker, Mehltheuer (DE); Lars Hoffmann, Munich (DE)

(73) Assignee: Thales Management & Services Deutschland GmbH, Ditzingen (DE)

( * ) Notice: Subject to any disclaimer, the term of this patent is extended or adjusted under 35 U.S.C. 154(b) by 476 days.

(21) Appl. No.: 16/826,108

(22) Filed: Mar. 20, 2020

(65) Prior Publication Data
US 2020/0231194 A1 Jul. 23, 2020

Related U.S. Application Data

(63) Continuation of application No. PCT/EP2018/075572, filed on Sep. 21, 2018.

(30) Foreign Application Priority Data

Sep. 22, 2017 (DE) ..................... 10 2017 216 811.0

(51) Int. Cl.
   *B61L 25/02* (2006.01)
   *G01K 13/00* (2021.01)
   *G01L 1/24* (2006.01)

(52) U.S. Cl.
   CPC .............. *B61L 25/02* (2013.01); *G01K 13/00* (2013.01); *G01L 1/246* (2013.01)

(58) Field of Classification Search
   CPC .......... B61L 25/02; B61L 1/164; B61L 1/166; B61L 1/06; B61L 23/042; G01K 13/00;
   (Continued)

(56) References Cited

U.S. PATENT DOCUMENTS 5,330,136 A 7/1994 Colbaugh
6,072,922 A * 6/2000 Albin ................... G01K 13/006
374/E11.015
(Continued)

FOREIGN PATENT DOCUMENTS

CN 200981565 Y 11/2007
CN 101712328 A 5/2010
(Continued)

OTHER PUBLICATIONS

Axle counter; Wikipedia, http://en.wikipedia.org/wiki/Axle_counter.

*Primary Examiner* — Tung S Lau
(74) *Attorney, Agent, or Firm* — Hackler Daghighian Martino & Novak

(57) ABSTRACT

A method of mounting a rail monitoring member/element at a mounting location of a rail for rail traffic, in particular on a railway track, is disclosed. The rail monitoring member includes a strain sensor member with a carrier on which a strain gauge, being an optical fiber with a fiber Bragg grating, is fixed. The method steps include: determination of the temperature of the rail and/or rail monitoring member at the mounting location; checking whether the determined temperature is within a predefined temperature interval; providing heating or cooling application to the rail and/or rail monitoring member at the mounting location, if the determined temperature is not within the predefined temperature interval; positioning and adhesively fixing of the carrier of the rail monitoring member at the mounting location. The method can be carried out easily and allows reliable and accurate monitoring of the rail using a strain sensor member.

16 Claims, 1 Drawing Sheet

(58) Field of Classification Search
CPC ...... G01K 5/48; G01K 11/3206; G01L 1/246; G01M 5/0025; G01M 5/0083; G01M 5/0091
See application file for complete search history.

(56) References Cited

U.S. PATENT DOCUMENTS

| | | | |
|---|---|---|---|
| 6,647,160 B1* | 11/2003 | Chi | G01L 1/246 385/12 |
| 8,861,973 B2* | 10/2014 | Tam | B61L 23/041 398/140 |
| 2006/0022063 A1 | 2/2006 | Tsai | |
| 2008/0019701 A1* | 1/2008 | Tam | B61L 23/041 398/141 |
| 2010/0021106 A1 | 1/2010 | Tam et al. | |
| 2013/0039613 A1* | 2/2013 | McNeilly | G01D 5/35316 385/13 |
| 2016/0356661 A1* | 12/2016 | Glueck | B61L 23/04 |
| 2018/0022367 A1* | 1/2018 | Oldewurtel | B61L 1/166 246/122 R |

FOREIGN PATENT DOCUMENTS

| | | | | |
|---|---|---|---|---|
| CN | 101797928 A | | 8/2010 | |
| CN | 206317836 | * | 7/2011 | ............... B61L 1/16 |
| CN | 202294870 U | | 7/2012 | |
| CN | 203177817 U | | 9/2013 | |
| CN | 103 982 502 A | | 8/2014 | |
| CN | 204214542 U | | 3/2015 | |
| CN | 204649162 U | | 9/2015 | |
| CN | 205860999 U | | 1/2017 | |
| CN | 108279037 A | * | 7/2018 | ............. G01D 21/02 |
| DE | 10 2014 117 334 A1 | | 6/2016 | |
| DE | 10 2015 209 721 B3 | | 10/2016 | |
| EP | 1 839 990 A2 | | 10/2007 | |
| EP | 3 069 952 A1 | | 9/2016 | |
| EP | 3 169 138 A1 | | 5/2017 | |
| JP | 2000 346 724 A | | 12/2000 | |
| JP | 2007 530 352 A | | 11/2007 | |
| JP | 2016 194 441 A | | 11/2016 | |
| JP | 2017 504 030 A | | 2/2017 | |
| WO | 2009/106576 A1 | | 9/2009 | |
| WO | 2014/023301 A2 | | 2/2014 | |
| WO | 2016/150670 A1 | | 9/2016 | |

* cited by examiner

METHOD FOR MOUNTING A RAIL MONITORING ELEMENT

CROSS-REFERENCE TO RELATED APPLICATIONS

This continuation application claims priority to PCT/EP2018/075572 filed on Sep. 21, 2018 which has published as WO 2019/057875 A1 and also the German application number 10 2017 216 811.0 filed on Sep. 22, 2017, the entire contents of which are fully incorporated herein with these references.

DESCRIPTION:

Field of the Invention

The invention relates to a method for mounting a rail monitoring member at a mounting location of a rail for rail traffic.

Background of the Invention

One possibility of mounting a rail monitoring member in the form of an axle counter on a rail is known from DE 10 2015 209 721 A1.

To make rail traffic safer, rail monitoring members (elements), e.g. a sensor member of an axle counter, are used. In particular, axle counters can be used to check whether the spot of the axle counter has been completely passed by a train, for example to determine whether associated track sections have become completely clear.

Such rail monitoring members comprise sensor members that generally have to be fixed to the rail.

The rail monitoring members can be screwed to the rail, as shown e.g. in https://en.wikipedia.org/wiki/Axle_counter. The disadvantage of this is that the rail has to be provided with appropriate holes, which is very costly and weakens the rail. Furthermore, the position of the rail monitoring member is defined and can only be changed with great effort.

It is known from DE 10 2015 209 721 A1 that a sensor member of an axle counter is mounted on the rail by means of a clamping device, which allows the appropriate sensor member to be used flexibly, as the clamping device can be easily mounted at any position on the rail.

Fiber optic sensors are becoming increasingly important in measurement systems. One or more sensors embedded in optical waveguides, such as fiber Bragg gratings, are used to detect strain in the optical fiber caused by a mechanical quantity and thus to detect forces, torques, accelerations, loads, pressure conditions, etc. EP 3 069 952 A1 describes the use of fiber optic sensors with fiber Bragg grating (=FBG, also Fiber Bragg Grating) as strain sensor members on railway tracks, e.g. as rail contact of an axle counter. However, the screw and clamp connections described above for mounting conventional rail monitoring members are unsuitable for such fiber optic sensors, as only the punctual fixing can be realized due to the. However, the elastic deformation caused by a passing train on the rail cannot be measured with the necessary accuracy in the case of punctual fixing.

SUMMARY OF THE INVENTION

Object of the Invention

It is therefore the object of the invention to propose a method of mounting a rail monitoring member (element) which, on the one hand, can be easily executed and, on the other hand, enables safe and accurate monitoring of the rail by using a strain sensor member.

Description of the Invention

According to the invention, this object is solved by a method according to the independent patent claim.

The method according to the invention relates to the mounting of a rail monitoring member comprising a strain sensor member with a carrier on which a strain gauge, in particular an optical fiber with a fiber Bragg grating, is fixed. The method according to the invention comprises the following method steps:

Determination of the temperature of the rail and/or the rail monitoring member at the mounting location;

Check whether the determined temperature is within a predefined temperature interval;

Heat or cooling application to the rail and/or rail monitoring member at the mounting location, if the determined temperature is not within the predefined temperature interval;

Positioning and fixing of the carrier of the rail monitoring member at the mounting location, wherein the fixing is carried out adhesively.

Railway tracks are mostly located outdoors and are therefore temporarily exposed to extreme conditions (weather, vibrations from passing trains). In addition, the line section on which the rail monitoring member is to be mounted should be cleared as quickly as possible so that normal train operation can be guaranteed and delays avoided or at least minimized. "Normal" bonding processes are therefore not suitable for mounting a rail monitoring member on a rail.

The temperature monitored adhesive fixing of the rail monitoring member according to the invention enables a two-dimensional frictional connection, which improves the performance of the strain gauges, especially the fiber optic sensors. The rail will not be damaged or weakened. Compared to conventional mounting techniques, the mounting of rail monitoring members can be carried out faster. In addition, manipulation and sabotage are hindered because the rail monitoring member cannot be detached non-destructively.

In order to create or improve the wettability of the mounting location, it is usually necessary to pre-treat the mounting location, e.g. by grinding.

According to the invention, a temperature monitoring and, if necessary, a temperature control of the rail and/or the carrier of the rail monitoring member is provided at the mounting location in order to bring the mounting location or the carrier into the temperature range intended for the bonding procedure. This ensures that the mounting can be executed regardless of weather conditions and prevents inhibition of curing due to too low temperatures or stress increases due to too high temperatures and the associated temperature expansion. To apply the bonding agent, the temperature of the mounting location is preferably set in the range −10° C. to +40° C., especially in the range 5° C. to 35° C. In addition, it is advantageous if the carrier is tempered before positioning.

Temperature measurement, positioning and temperature control can be carried out at different times, so that the affected line section can be temporarily cleared while the mounting method according to the invention is being carried out, for example to allow a train to pass.

The method in accordance with the invention thus enables a two-dimensional fixing of the carrier, which can be carried out in stages (e.g. between two passing trains) independent of the weather.

The carrier material used is preferably spring steel or rail steel.

In a particularly advantageous variation of the method according to the invention, the fixing is carried out by means of a heat-activated permanent connection, wherein after positioning the rail monitoring member at the mounting location, a heat application and pressure application is carried out to activate the permanent connection.

The heat-activated permanent connection is preferably realized by a heat-activated surface member (e.g. a heat-activated film (HAF)), i.e. by a heat-activated film which is non-sticky at room temperature. Only when heat is applied is the film's bonding layer activated. The heat-activated surface member is first pre-applied (tagging) to the side of the carrier of the rail monitoring member that is to be connected to the rail, wherein the surface member is not yet activated. The rail monitoring member is then placed under pressure application against the rail at the mounting location and the heat-activated surface member is cured by heat input into the carrier (typically at 80° C. to 250° C.). Such a connection has a high load capacity.

The use of heat-activated surface members guarantees easy handling at the mounting location, as usually only a protective foil has to be removed on site. The procedure can therefore also be applied by a mechanic in particular. In addition, only a relatively low pressure application is required. By means of heat-activated surface members, sequential work is made possible, i.e. between the individual method steps (preparation of the mounting location, installation of the temperature sensors, temperature control, positioning of the heat-activated surface member, activation of the heat-activated surface member) the line section can be repeatedly cleared for being passed over so that rail traffic is only minimally affected.

Heat-activated surface members also have the advantage that there is no negative influence on the sensor technology.

It is particularly advantageous if a heat-activated film is pre-applied to the rail monitoring member. The heat-activated film does not have to be attached at the mounting location, but can be applied to the carrier during production or in a preparation room (e.g. the day before). Therefore, no bonding preparations on the sensor are necessary at the mounting location, which results in time savings during mounting. The line section can therefore be cleared again more quickly. Furthermore, the attachment of the heat-activated film can take place under defined conditions (laboratory conditions).

Alternatively, the fixing can be done with a two-component bonding agent.

Here it is advantageous if, after positioning the rail monitoring member at the mounting location, a heat application takes place to accelerate the hardening of the permanent connection. The rail monitoring member and/or the rail are heated up to approx. 180° C., for example.

For determination of the temperature of the mounting location it is advantageous to fix temperature sensors on the rail, especially on both sides of the mounting location. The rail monitoring member is therefore mounted between the temperature sensors.

In addition to monitoring the temperature of the mounting location, it can also be advantageous to determine the temperature of at least one other member involved in the fixing process, especially the fiber optic sensor and/or the environment and/or the bonding agent. In this way it can be determined whether optimum bonding conditions prevail.

If it is determined that the measured temperatures are not optimal (i.e. are outside of predetermined intervals), a temperature control of at least one of the other members involved in the fastening process can be carried out depending on the determined temperature of at least one of the other members involved in the fixing process. In this way it can be ensured that the optimum processing temperature is maintained.

It is preferable to apply heat to the rail in the area of the mounting location prior to positioning the rail monitoring member. Before the bonding agent comes into contact with the rail, the rail is preheated to a temperature > 10° C., e.g. by means of a gas burner or contact heat (generated electrically or chemically).

It is particularly advantageous if heat and pressure are applied to the rail monitoring member after positioning. This can either activate the bonding agent or accelerate the curing of the bonding agent.

It is particularly advantageous if the heat application is carried out inductively at the mounting location by means of an inductive heating member. For this purpose, the heating member (induction coil) is brought near the rail monitoring member positioned at the mounting location. This type of heat application is particularly preferred for heating up the carrier of the rail monitoring member. The induction coil induces eddy current in the carrier of the rail monitoring member and thus heats the carrier. By using an inductive heating, open flames can be avoided and thus the risk of fire can be minimized.

In a particularly advantageous variation, the inductive heating member is controlled in dependence on the temperature determined by the temperature sensors. This enables particularly easy handling by the mounting personnel, as only the controlled heating procedure has to be started. The heating process is then automatically monitored.

The positioning of the rail monitoring member preferably takes place in the area of the rail web, i.e. in the connection area of the rail between rail base and rail head. This simplifies mounting, as the curvature of the rail (in vertical direction) is minimal.

The rail monitoring member is preferably a rail contact sensor (rail contact half) of an axle counter. In addition, the rail monitoring member can be a temperature sensor, acceleration sensor, weight sensor with fiber optic sensor members.

In one variation, the strain gauge (e.g. an optical fiber) is already preloaded on the carrier. The sensor member can then be very easily mounted on the rail.

In a special variation, the strain sensor member is pre-tensioned before or during positioning at the mounting location and is adhesively fixed to the rail in the pretensioned state. This makes it easy to determine when the carrier has detached from the rail, since the Bragg wavelength of the fiber Bragg grating changes upon omission of the preload. The preload can be done mechanically before attaching the fiber Bragg gratings to the rail.

In a special variation, the preload is generated thermally while the carrier is attached to the rail. For this purpose, during the bonding process, a predefined temperature difference between the strain gauges and the carrier is maintained during the entire bonding process. When the bonding process is complete, the carrier and strain gauges cool down from different temperatures to the same temperature, resulting in tension after cooling.

Further advantages of the invention will become apparent from the description and the drawings. Likewise, according to the invention, the above-mentioned features and those which are to be explained below can each be used individually for themselves or for a plurality of combinations of any kind. The embodiments shown and described are not to be understood as an exhaustive enumeration, but rather have exemplary character for the description of the invention.

DETAILED DESCRIPTION OF THE PREFERRED EMBODIMENTS

Figure 1:
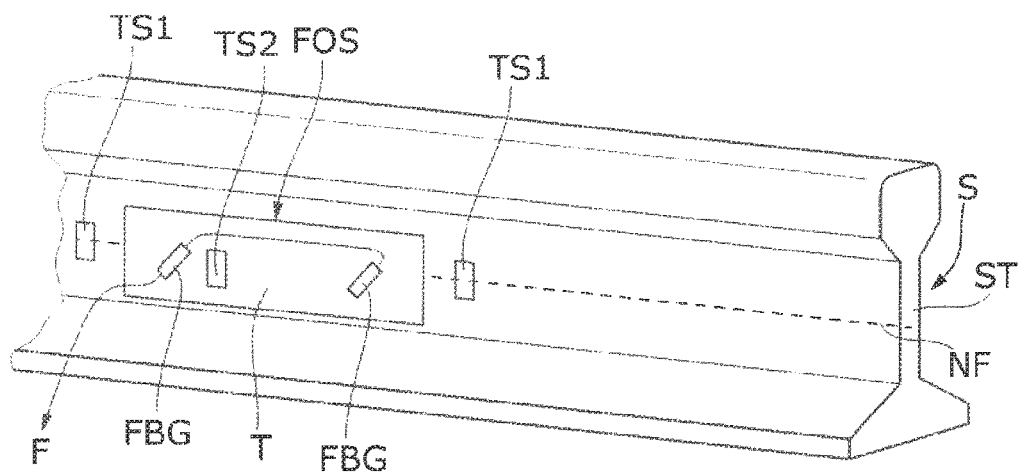
FIG. 1 shows a perspective view of a rail with mounted rail monitoring member.
Figure 2:
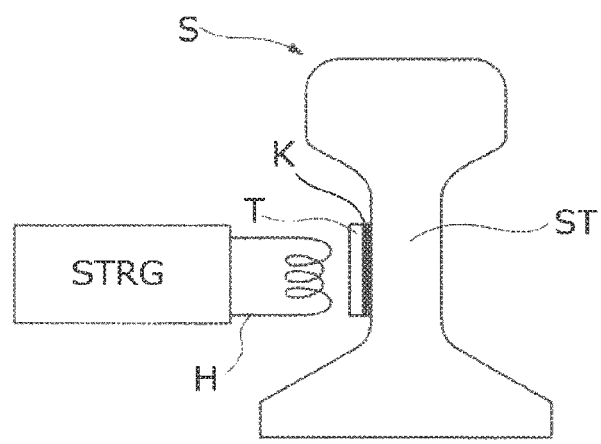
FIG. 2 shows a section of a rail with mounted rail monitoring member and inductive heating.

FIG. 1 shows a perspective view of a rail S with a neutral fiber NF. A rail monitoring member (element) in the form of a fiber optic sensor member FOS is mounted on rail S. The fiber optic sensor member FOS comprises a carrier T on which fiber Bragg gratings FBG are premounted. By means of an adhesive connection the carrier T is mounted in the area of the rail web ST of the rail S. The fiber optic sensor member FOS is preferably mounted in the area of the neutral fiber NF, in particular in such a way that each fiber Bragg grating FBG is arranged with one end below the neutral fiber NF and the other end above the neutral fiber NF. Temperature sensors TS1 are attached to the rail S, with which the temperature of the rail S can be monitored before and during the bonding process. This is necessary because the bonding process must take place at a temperature within a predefined temperature interval, which is often not fulfilled due to weather conditions. In order to enable the mounting of the fiber optic sensor member FOS on the rail S independent of the weather, the temperature of the rail S is determined by means of the temperature sensors TS1 and if necessary, heat is applied to the rail. In addition, at least one further temperature sensor TS2 is used to determine the temperature of the sensor member FOS, in particular the temperature of the carrier T and/or the strain gauge FBG. Heat may also be applied to the sensor member FOS. This can be done by means of an inductive heating member H, for example, as shown in FIG. 2. The inductive heating member H is controlled by a control unit STRG in dependence on the temperature determined by the temperature sensor TS2.

The inductive heating member H is used in particular to cure a bonding agent applied to the rail S and/or the carrier T as part of the bonding process or, if a heat-activated film is used, to activate it. The temperature sensors TS1, TS2 are removed after mounting and can be used for mounting another sensor member.

In the example shown, the fiber optic sensor member FOS comprises two fiber Bragg gratings FBG. However, fiber optic sensor members are also conceivable which comprise only a single fiber Bragg grating FBG or a variety of them. In the case shown in FIG. 1, the fiber optic sensor member represents a rail contact sensor of a counting point of an axle counter.

With the method according to the invention, an easy to execute and secure surface connection between the carrier T of the fiber optic sensor member FOS and the rail S is enabled. In particular, a two-dimensional frictional connection between the fiber optic sensor member FOS and the rail is realized, ensuring that the strain of the fiber Bragg grating FBG can be reliably detected. The method according to the invention enables the use of fiber-optic sensors on rails, in particular in the railway sector, as a result of which negative influence on the rail monitoring members by, for example, unwanted induction can be avoided.

LIST OF REFERENCE SIGNS

FBG fiber Bragg grating
FOS fiber optic sensor member
H inductive heating member
K bonding layer
NF neutral fiber
S rail
ST rail web
STRG control unit
T carrier
TS1 Temperature sensor for determination of the temperature of the rail
TS2 Temperature sensor for determination of the temperature of the sensor member

What is claimed is:
1. A method for mounting a rail monitoring member at a mounting location of a railway track for rail traffic, the method comprising the steps of:
providing a strain sensor member with a carrier on which a strain gauge is fixed, wherein the strain gauge is an optical fiber with a fiber Bragg grating;
determining the temperature of the rail and/or rail monitoring member at the mounting location;
checking whether the determined temperature is within a predefined temperature interval;
applying heat or cool to the rail and/or rail monitoring member at the mounting location, if the determined temperature is not within the predefined temperature interval; and
positioning and fixing of the carrier of the rail monitoring member at the mounting location, wherein the fixing is carried out adhesively.
2. The method according to claim 1, wherein the fixing is carried out by means of a heat-activated permanent connection, wherein after positioning of the rail monitoring member at the mounting location, a heat and pressure application takes place to activate the permanent connection.
3. The method according to claim 2, wherein a heat-activated film is pre-attached to the rail monitoring member.
4. The method according to claim 1, wherein the fixing is carried out by means of a two-component bonding agent.
5. The method according to claim 4, wherein after positioning the rail monitoring member at the mounting location, a heat application takes place to accelerate the hardening of the permanent connection.
6. The method according to claim 1, wherein temperature sensors are fixed to the rail, in particular on both sides of the mounting location, to determine the temperature of the mounting location.
7. The method according to claim 1, wherein the temperature of at least one other member involved in the fixing process is determined, the at least one other member being the fiber optic sensor and/or the environment and/or the bonding agent.
8. The method according to claim 7, wherein a temperature control of the at least one of the other members involved in the fixing process is performed, in dependence on the determined temperature of the at least one of the other members involved in the fixing process.

9. The method according to claim 1, wherein prior to positioning the rail monitoring member, heat is applied to the rail in the area of the mounting location.

10. The method according to claim 1, wherein heat and pressure are applied to the rail monitoring member after positioning.

11. The method according to claim 1, wherein the heat application takes place inductively at the mounting location by means of an inductive heating member.

12. The method according to claim 11, wherein the inductive heating member is controlled in dependence on the temperature determined by means of the temperature sensors.

13. The method according to claim 1, wherein the positioning of the rail monitoring members takes place in the area of the rail web.

14. The method according to claim 1, wherein the sensor member is preloaded before or during positioning at the mounting location and is adhesively fixed to the rail in the preloaded state.

15. The method according to claim 14, wherein the preload is thermally generated while the carrier is attached to the rail.

16. The method according to claim 1, wherein the rail monitoring member is a strain sensor member being a rail contact half of a counting point of an axle counter.

* * * * *